Sept. 14, 1948. R. H. VOLGENAU ET AL 2,449,348
BEEHIVE
Filed Aug. 21, 1945 2 Sheets-Sheet 2
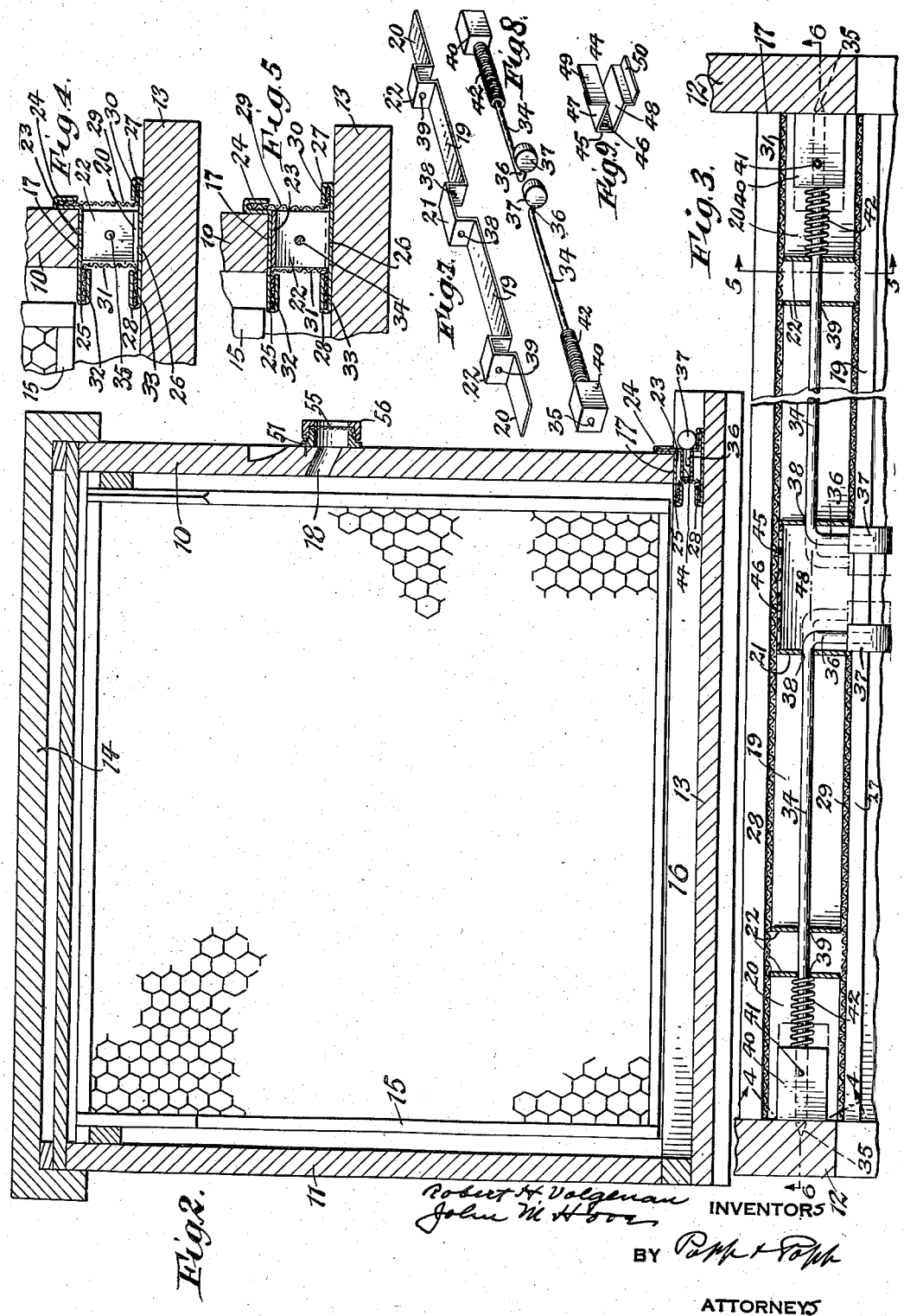

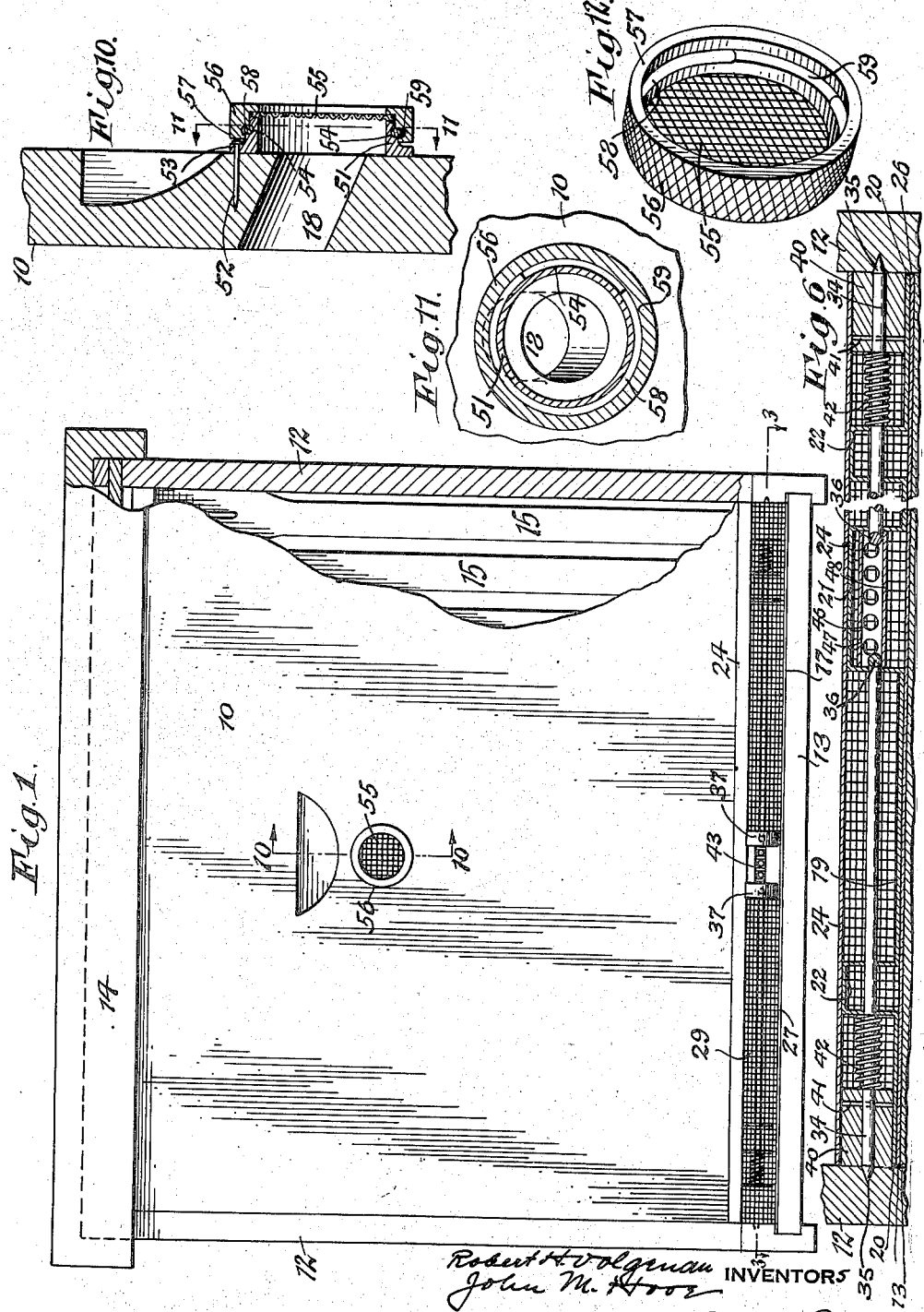

Patented Sept. 14, 1948

2,449,348

UNITED STATES PATENT OFFICE 2,449,348

BEEHIVE

Robert H. Volgenau, Buffalo, and John M. Hooe, Ogdensburg, N. Y.

Application August 21, 1945, Serial No. 611,740

11 Claims. (Cl. 6—4)

This invention relates to a beehive and more particularly to means whereby the opening through which the bees normally enter and leave the hive may be screened so as to confine the bees therein while the hive is being transported from one place to another, or when confinement of the bees is otherwise desirable, and still provide the necessary ventilation of the hive for maintaining the bees in good condition therein.

At times it is desirable to confine swarms of bees in hives without moving the latter to a new place and it is also the practice to confine the bees in hives when they are transferred from one place to another for pollinizing blossoms in different localities.

In order to prevent the escape of bees from the hive while being transported and still maintain ventilation of the same it has been customary heretofore to temporarily cover the bee entrance, opening or passage with strips of wire cloth or the like of sufficiently fine mesh to prevent the bees from leaving the hive but still permitting sufficient air to enter the hive in order to avoid smothering the bees. Such temporary closures have usually been nailed on the outer side of the hive across the bee entrance thereof and then ripped off when the same was no longer required, both of which operations require an undue amount of time and also mutilate the hive more or less, both of which are objectionable particularly when transporting a large number of hives which must be restored to normal conditions as rapidly as possible after the hives have reached their destination in order to maintain the bees in good condition.

It is the object of this invention to provide screening closures for the entrances of beehives which can be applied to the hives and removed therefrom quickly and conveniently without injury to the bees and without the use of any tools or nails whereby the hive may be mutilated and its appearance impaired.

A further object of this invention is to provide a screening closure for this purpose which can be readily and quickly used on different hives and thereby effecting a substantial saving in time and expense whenever beehives are transported from one locality to another and the entrance of the same must be closed during such transportation.

In the accompanying drawings:

Fig. 1 is a front elevation of a beehive equipped with approved forms of this invention.

Fig. 2 is a vertical longitudinal section of the same taken centrally through the hive.

Fig. 3 is a fragmentary horizontal section, on an enlarged scale, taken on line 3—3, Fig. 1, and looking downwardly.

Figs. 4 and 5 are fragmentary vertical sections taken on the correspondingly numbered lines in Fig. 3.

Fig. 6 is a fragmentary vertical transverse section taken on line 6—6, Fig. 3.

Fig. 7 is a perspective view of a strip forming part of the frame of one form of screening closure embodying this invention.

Fig. 8 is a similar view of the retaining means whereby the closure shown in Figs. 3–6 is secured in place in a bee entrance of the hive.

Fig. 9 is a similar view of the guide used in connection with the closure retaining means shown in Figs. 3, 4, 5 and 6.

Fig. 10 is a fragmentary vertical section, on an enlarged scale, taken on line 10—10, Fig. 1, and showing a modified form of screening closure for an opening or bee passage in the upper part of the hive.

Fig. 11 is a vertical cross section taken on line 11—11, Fig. 10.

Fig. 12 is a perspective view of the detachable cover for the screen element of the closure shown in Figs. 10 and 11 and in the upper parts of Figs. 1 and 2.

In the following description similar characters of reference indicate like parts in the several figures of the drawings:

Although this invention is applicable to beehives which may be variously constructed the same is illustrated in the accompanying drawings, as an example, in connection with a beehive, the housing of which comprises a brood chamber having front, rear and side walls 10, 11, 12, a bottom board 13 upon which the lower end of the brood chamber rests, and a cover 14 removably mounted on the top of the brood chamber. The frames 15 upon which the bees build the cells forming the honey comb adapted to receive the honey are removably mounted within the brood chamber so that the lower ends of these frames are elevated a short distance above the bottom board and form an entrance chamber 16 underneath these frames.

The front wall 10 of the brood chamber forming part of the beehive housing terminates at its lower end above the bottom board so as to form an opening, passage or entrance 17 between this front wall and the bottom board which is elongated horizontally and transversely and through which the bees mainly enter and leave the hive. On its upper central part this front wall of the housing is also provided with an auxiliary opening 18 which mainly serves the purpose of ventilating the interior of the beehive but also is used by the bees for entering and leaving the hive.

Means are provided for temporarily screening the lower and upper entrances, openings or passage-ways of the bees which embody the present invention and serve to confine the bees within the hive while the same is being transported.

That form of this invention which is best suited for the horizontally elongated lower bee entrance or opening 17 at the lower end or bottom of the beehive is shown in Figs. 1-9 and constructed as follows:

In general the screening closure shown in Figs. 1-9 comprises a frame which is adapted to be moved into and out of the lower opening or entrance 17 of the beehive, screening means mounted on this frame and adapted to permit the passage of air into and out of the beehive but prevent the passage of bees therethrough, and retaining means whereby the closure frame and its screening means are held in the main entrance or opening and prevented from becoming displaced while the hive is being transported or handled.

The frame of the screening closure includes a frame strip preferably constructed of sheet metal and bent to form a plurality of horizontal lower webs or base sections 19, 19, 20, 20 and a plurality of upper loops 21, 22, 22 which alternate with the webs and project upwardly therefrom. In the preferred construction of this frame strip the same comprises a single central loop 21 which projects upwardly from the opposing edges of two intermediate webs 19, 19 and two side loops 22 which are arranged adjacent to opposite ends of this frame strip and each of which projects upwardly from one of the intermediate webs 19 of this strip and the adjacent end web 20 of the same. Above these loops and extending lengthwise of the frame strip is an upper frame plate 23 of sheet metal or the like which rests on the upper ends of the loops and is provided at its front edge with a vertical fold channel 24 having its groove opening downwardly, while its rear edge is provided with a horizontal fold or channel 25 the groove of which opens forwardly. Arranged lengthwise along the underside of the frame strip and engaging with the underside of the webs thereof is a lower frame plate 26 of sheet metal which has its front edge provided with a horizontal fold or channel 27 the groove of which opens rearwardly, while the rear edge of this lower plate is provided with a horizontal longitudinal fold or channel 28 the groove of which opens forwardly.

The numeral 29 represents the vertical body of a front screen made of woven wire or the like which extends the full length of the frame strip and plates except for an opening in its central part for the reception of the means which operate the fastener of the closure. This front screen has its upper vertical edge secured in the front channel 24 of the upper plate while its lower edge is provided with a forwardly projecting flange 30 which is secured in the groove of the rearwardly opening channel 27 at the front edge of the lower frame plate.

The numeral 31 represents the vertical body of a rear screen which extends the full length of the frame strip and plates along the inner side of the latter and is provided at its upper edge with a rearwardly projecting flange 32 which is secured in the forwardly opening channel 25 on the rear edge of the upper plate while the lower edge of this screen body is provided with a rearwardly projecting flange 33 which is secured in the forwardly opening channel 26 on the rear edge of the lower frame plate, as best shown in Figs. 4 and 5.

The edge portions of these screens may be firmly secured in the respective channels of the frame plates by closing these channels on the screens sufficiently tight for this purpose and also by punch marking or soldering these parts together.

When the frame members and screen members are thus secured together, the same form a rigid unitary structure which can be readily moved into and out of the longitudinally elongated lower entrance or opening 17 of the housing of the beehive and when this unit is arranged within this lower bee entrance or opening, the bottom frame plate 26 rests upon the bottom board 13 of the hive, the upper frame plate 23 engages with the top of this bee entrance and the front vertical channel 24 of the upper frame plate engages with the outer side of the front wall 10 of the housing, as shown in Figs. 1, 2, 4 and 5, and thereby serves as a stop to limit the inward or backward movement of the closure in this bee entrance. The length of this closure is equal to the horizontal width of the bee entrance 17 so that the opposite ends of this screening closure unit engage with the opposite ends or vertical walls of the main entrance, as shown in Figs. 1, 3 and 6 and thereby prevent the bees from passing into and out of the hive between this closure and the walls of this entrance or opening.

Manually operable retaining means are provided whereby this screening closure is reliably held within the main entrance or opening and prevented from becoming displaced by jarring or otherwise while the beehive is being transported. These retaining means in their preferred form, as shown in Figs. 1-9, are constructed as follows:

The numerals 34, 34 represent two retaining pins or rods which are arranged lengthwise in the opposite end portions of the closure frame and provided at their outer ends with points 35, 35 which are adapted to engage with the vertical end walls of the elongated main bee entrance while the opposing inner ends of these retaining pins are provided respectively, with forwardly projecting handles or arms 36 which are provided at their front ends with finger pieces 37, 37, as shown in Figs. 1, 2, 3 and 8.

Each of these retaining pins passes with its inner part adjacent to its handle through an opening 38 in one of the upright walls of the central loop 21, while the intermediate part of this retaining pin passes through corresponding openings 39, 39 in the end loop 22 on the respective part of the frame strip, as best shown in Figs. 3 and 6.

Each of the retaining pins is provided at its outer end adjacent to its point with a block 40 which is secured thereto by means of a transverse pin 41, as shown in Figs. 3 and 6, which block is preferably square in cross section and bears with its lower and upper flat sides against the lower and upper frame plates 26, 23, as shown in Fig. 4, thereby holding the respective retaining pin against turning. Each of the retaining pins is yieldingly held in its outermost position by means of a spring 42 which is preferably of helical form and surrounds the outer part of this retaining pin and bears at its outer end against the inner end of the block 40, while its inner end bears against the outer wall of the adjacent side loop 22, as shown in Figs. 3 and 6.

The handle and finger pieces of the retaining pins project forwardly through a slot 43 formed in the upright body of the front screen section so that the finger pieces are accessible for manual operation when it is desired to apply the screening closure to and remove the same from the lower entrance of the beehive.

When it is desired to apply the screening closure to the beehive the attendant presses the two finger pieces 37 together so that they are shifted from the position shown by full lines in Fig. 3 to the position shown by dotted lines in the same figure, whereby these pointed ends are withdrawn into the end portions of the frame members. While the parts are in this position the bee keeper can easily introduce the closure into the lower horizontally elongated bee entrance or opening until the upper front channel 24 of the closure frame engages with the front wall 10 of the beehive and upon then releasing the grip upon the finger pieces the springs 42 will project the retaining pins horizontally in opposite directions and press the points of the same into the opposite upright walls or ends of this bee entrance, as shown in Fig. 3, and whereby this screening closure is reliably held in this bee entrance. When the screening closure is removed from the beehive the outward movement of the retaining pins 34 is limited by engagement of the arms 36 with the inner sides of the central loop 21 which serve as stops for such movement and prevent the points of the retaining pins from projecting an undue extent beyond the opposite ends of the screening closure when the latter is not in use.

The inner parts of the retaining pins are prevented from rotating an appreciable extent by guide means which are mounted between the central parts of the upper and lower frame plates 23, 25 and within the central loop 21 of the frame strip and which are preferably constructed as follows:

Referring more particularly to Figs. 1, 2, 3, 6 and 9, the numeral 44 represents in general a guide member which is generally of U-shape and constructed of sheet metal so as to form a rear wall 45 which is adapted to engage with the inner side of the rear screen 31 and provided with perforations 46 to permit the passage of air therethrough but prevent the passage of bees, two horizontal guide walls 47, 48 projecting forwardly from the upper and lower edges of this rear wall and forming between them a guideway which receives the handle or arms 36 of both retaining pins, an upper vertical flange 49 arranged at the front edge of the upper guide wall 47 and secured in the groove 24 of the vertical channel of the upper guide plate and a horizontal flange 50 connected with the front edge of the lower guide wall 48 and projecting forwardly therefrom and secured in the lower horizontal channel 27 of the lower frame plate, as shown in Fig. 2. The space between the upper and lower guide walls 47, 48 is such that they are sufficiently close to the arms 36 of the retaining pins to prevent any appreciable vertical rotation of these arms while the same are manipulated but at the same time serve as a guide for these arms as they are moved toward and from each other when moving the points of the retaining pins into and out of their operative positions.

It will be noted that in this closure for the bee passage or opening of the housing the frame and screen are retained in this opening by engagement of the upper and lower horizontal sides of the frame with the horizontal top and bottom of this opening and that the blocks 40 are manually operable and that the same slide horizontally on the frame toward and from the vertical sides of this opening and are held yieldingly in engagement therewith and may be retracted therefrom. It is therefore possible to use this closure device for beehive openings which differ somewhat in width inasmuch as the blocks 40 can be projected various distances from the opposite ends of the closure frame and engage the vertical sides of the openings even though the same may be of varying widths and still produce an effective closure for the same thereby avoiding the necessity of fitting the closure accurately to the beehive openings.

The preferred form of this invention for use in connection with a bee entrance or ventilating opening 19 which is round or substantially so, as shown in Figs. 1, 2, 10, 11 and 12, is constructed as follows:

The numeral 51 represents a horizontal tubular or cylindrical body which is secured to the outer side of the front wall 10 of the brood chamber around the upper bee opening therein by means of nails 52 passing through a flange 53 on the inner end of this tube and into this wall, as shown in Fig. 10. On the front part of its periphery this tube is provided with an annular groove 54.

The numeral 55 represents a screen which may be attached to or removed from the tubular body so as to either cover the bore or opening in this tube when required or uncover the same when not required. This screen is of disk shape and mounted on a circular or annular cap which is L-shaped in cross section and provided with a tubular wall 56 which is adapted to slip over the front end of the tubular body and an inwardly projecting flange 57 which is arranged at the front end of the cap and has the marginal part of the screen 55 secured to its inner side by soldering or otherwise.

Means are provided for yieldingly interlocking the tubular cap and body of the screen closure shown in Figs. 1, 2, 10, 11 and 12 which preferably comprise a split spring ring 58 which is round in cross section and loosely seated when its outer side is in an annular groove 59 within the bore of the cap, while its inner side is adapted to snap into the annular groove 54 on the periphery of the tubular body. When the screen cap is detached from the body 51, as shown in Fig. 12, the retaining spring 58 is contracted so that its diameter is somewhat less than the diameter of the periphery of the tubular body. Upon pushing the cap backwardly over the tubular body the split ring is expanded somewhat and remains in this position until it comes in line with the annular groove in the tubular body and then the split ring contracts due to its resilience and engages its inner side with the groove of the tubular body, as shown in Fig. 11, and thereby holds the cap or cover ring against displacement on the tubular body. The tension of the spring is such that the same will readily contract and expand on pushing the cap onto the body and pulling the same therefrom, thereby enabling this particular form of screening closure to be easily and quickly applied so that a substantial amount of time is saved when a large number of hives have to be served within a short period.

Both forms of this invention are comparatively simple in construction and capable of being produced at low cost. They also permit of quickly and reliably guarding against the loss of bees during transportation and also permit of applying screening closures to the hives without mutilating the same or impairing their appearance.

We claim as our invention:

1. A beehive comprising a housing having an opening for the passage of bees and means for screening said opening including a frame removably arranged in said opening and having a strip bent to form lower horizontal parts and upwardly projecting loops which alternate with said lower parts, retaining pins guided on said loops and having pointed outer ends, spring means for moving said pins outwardly and engaging their points with the opposite ends of said opening, handles arranged on the inner ends of said pins for manually moving the points thereof out of engagement from the housing, and a screen mounted on said frame and extending across said opening.

2. A beehive comprising a housing having an opening for the passage of bees, and means for screening said opening including a frame removably arranged in said opening and having a strip bent to form lower horizontal parts and upwardly projecting loops which alternate with said lower parts, and one of which is arranged centrally on said strip and others adjacent to opposite ends of the same, retaining pins having pointed outer ends adapted to engage the opposite ends of said opening and each having its outer part guided in one of said end loops and its inner part guided in said central loop, handles arranged on the inner ends of said pins with the central loop, and a screen mounted on said frame and extending across said opening.

3. A beehive comprising a housing having an opening for the passage of bees, and means for screening said opening including a frame removably arranged in said opening and having a strip bent to form lower horizontal parts and upwardly projecting loops which alternate with said lower parts, and one of which is arranged centrally on said strip and others adjacent to opposite ends of the same, retaining pins having pointed outer ends adapted to engage the opposite ends of said opening and each having its outer part guided in one of said end loops and its inner part guided in said central loop, handles arranged on the inner ends of said pins with the central loop, guide blocks secured to said pins outside of said end loops, springs mounted on said pins between said end loops and said guide blocks, and a screen mounted on said frame and extending across said opening.

4. A beehive comprising a housing having an opening for the passage of bees, and means for screening said opening and including a frame having a strip provided centrally with a loop, retaining pins sliding in said loop and having pointed outer ends adapted to engage opposite ends of said opening and provided at their inner ends within said loop with forwardly projecting handle arms, a U-shaped guide which is arranged within said loop and which receives said arms, and a screen mounted on said frame and extending across said opening.

5. A beehive comprising a housing having an opening for the passage of bees, and means for screening said opening and including a frame having a strip provided with guide loops, upper and lower frame plates arranged above and below said frame strip, a screen mounted on said frame strip and frame plates, and retaining pins slidable on said loops and movable into and out of engagement from the opposite ends of said opening.

6. A beehive comprising a housing having an opening for the passage of bees, and means for screening said opening including a frame strip bent to form a plurality of longitudinal webs and a plurality of vertical loops alternating with said webs, upper and lower frame plates arranged respectively above and below said frame strip and each frame plate provided at its front and rear edges with channels, screens arranged in front and in rear of said frame strip and each having its upper and lower edges secured in the corresponding channels of said frame plates, and retaining pins movably mounted on said frame strip and adapted to engage the opposite ends of said opening.

7. A beehive comprising a housing having an opening for the passage of bees, and means for screening said opening including a frame strip bent to form a plurality of longitudinal webs and a plurality of vertical loops alternating with said webs, upper and lower frame plates arranged respectively above and below said frame strip and each frame plate provided at its front and rear edges with channels, screens arranged in front and in rear of said frame strip and each having its upper and lower edges secured in the corresponding channels of said frame plates, and retaining pins movably mounted on said frame strip and adapted to engage the opposite ends of said opening, the front channel of said upper frame plate projecting upwardly therefrom and forming a stop for engagement with the outer side of said housing.

8. A beehive comprising a housing having an opening for the passage of bees, and means for screening said opening including a frame strip which is bent to form lower horizontal parts and upwardly projecting loops which alternate with said lower parts and one of which is arranged centrally on said strip and others adjacent to opposite ends thereof, upper and lower frame plates arranged, respectively, along the upper and lower sides of said strip, said upper plate having a vertical channel at its front edge and a horizontal channel at its rear edge and said lower plate having horizontal channels at its front and rear edges, front and rear screens arranged along the front and rear edges of said strip having their front and rear edges secured, respectively, in the front and rear channels of said plates, retaining pins guided on said strip and provided with pointed outer ends adapted to engage with opposite ends of said opening and provided at their inner ends with handles, and spring means for moving said pins outwardly toward opposite ends of said opening.

9. A beehive comprising a housing having an opening for the passage of bees, and means for screening said opening including a frame movable into and out of said opening, a screen mounted on said frame, and means for retaining said frame and screen in said opening including retaining pins movable lengthwise on said frame and provided at their outer ends with points adapted to engage opposite ends of said opening and having handles at their inner ends, and means for guiding said handles including a guide having two walls which receive said handles between them, a rear wall connecting the rear ends of said walls, and flanges arranged on the front ends of said walls and connected, respectively, with the upper and lower parts of said frame.

10. A beehive comprising a housing having an opening for the passage of bees, and means for screening said opening including a frame adapted to be placed in said opening and having upper and lower parts arranged close to the top and bottom of said opening and opposite ends which oppose the sides of said openings, a screen mounted on said frame, and retaining means for holding said frame and screen in said opening including blocks arranged at opposite ends of said frame and screen and movable relative to the sides of said opening and adapted to be held in engagement with said sides.

11. A beehive comprising a housing having an opening for the passage of bees, and means for screening said opening including a frame adapted to be placed in said opening and having upper and lower parts arranged close to the top and bottom of said opening and opposite ends which oppose the sides of said openings, a screen mounted on said frame, and retaining means for holding said frame and screen in said opening including blocks arranged at opposite ends of said frame and screen and movable relative to the sides of said opening, and manually operated means for holding said blocks yieldingly in engagement with said sides and retracting the same therefrom.

ROBERT H. VOLGENAU.
JOHN M. HOOE.

REFERENCES CITED

The following references are of record in the file of this patent:

UNITED STATES PATENTS

| Number | Name | Date |
|---|---|---|
| 14,945 | Beetle | May 27, 1856 |
| 147,222 | Canniff | Feb. 3, 1874 |
| 476,762 | Taylor | June 7, 1892 |
| 1,369,190 | Podhajny | Feb. 22, 1921 |
| 1,374,732 | Hamilton | Apr. 12, 1921 |